(12) United States Patent
Lv et al.

(10) Patent No.: US 8,982,769 B2
(45) Date of Patent: Mar. 17, 2015

(54) METHOD, BASE STATION, AND RELAY DEVICE FOR RECEIVING PHYSICAL UPLINK CONTROL INFORMATION

(75) Inventors: Yongxia Lv, Beijing (CN); Yumei Miao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 13/282,955

(22) Filed: Oct. 27, 2011

(65) Prior Publication Data

US 2012/0093067 A1   Apr. 19, 2012

Related U.S. Application Data

(63) Continuation of application No. PCT/CN2009/071492, filed on Apr. 27, 2009.

(51) Int. Cl.
  *H04B 7/155*   (2006.01)
  *H04W 72/04*   (2009.01)
  (Continued)

(52) U.S. Cl.
  CPC .......... *H04B 7/15542* (2013.01); *H04L 5/0055* (2013.01); *H04L 5/0053* (2013.01); *H04W 84/047* (2013.01); *H04W 72/0406* (2013.01)
  USPC .......................................... 370/315; 370/329

(58) Field of Classification Search
  CPC ... H04L 5/0005; H04L 5/0007; H04L 5/0053; H04L 5/0055; H04J 11/00; H04J 13/12
  USPC .................. 370/315, 329, 341–343
  See application file for complete search history.

(56) References Cited

U.S. PATENT DOCUMENTS

| 5,659,879 A | 8/1997 | DuPuy |
| 2007/0153834 A1* | 7/2007 | Qu et al. ................ 370/478 |

(Continued)

FOREIGN PATENT DOCUMENTS

| CN | 1109251 A | 9/1995 |
| CN | 1980466 A | 6/2007 |

(Continued)

OTHER PUBLICATIONS

Nortel, "Discussion paper on the control channel and data channel optimization for relay link," 3GPP R1-091384, Korea, Mar. 23-27, 2009.

(Continued)

*Primary Examiner* — Farah Faroul
(74) *Attorney, Agent, or Firm* — Slater & Matsil, L.L.P.

(57) ABSTRACT

A method, base station, and relay device for receiving physical uplink control information are disclosed in the present invention. The method includes: selecting a PUCCH resource of the relay, where the PUCCH resource can form multiplexing with a first resource, and the first resource includes the PUCCH resource occupied by a 3GPP LTE terminal when the terminal transmits the physical uplink control information in a first format; determining a channel index corresponding to the PUCCH resource of the relay; transmitting notification information to the relay, where the notification information includes the channel index; and receiving the physical uplink control information transmitted, according to the channel index, by the relay. In the embodiments of the present invention, the interference between the PUCCH format 1/1a/1b channel of the relay and that of the LTE R8 terminal is effectively reduced.

14 Claims, 7 Drawing Sheets

(51) Int. Cl.
*H04J 13/12* (2011.01)
*H04L 5/00* (2006.01)
*H04W 84/04* (2009.01)

(56) References Cited

U.S. PATENT DOCUMENTS

| | | | |
|---|---|---|---|
| 2008/0311919 A1 | 12/2008 | Whinnett et al. | |
| 2009/0073955 A1* | 3/2009 | Malladi | 370/349 |
| 2009/0103482 A1 | 4/2009 | Imamura et al. | |
| 2009/0103562 A1* | 4/2009 | Frederiksen et al. | 370/468 |
| 2009/0129259 A1* | 5/2009 | Malladi et al. | 370/210 |
| 2009/0207793 A1* | 8/2009 | Shen et al. | 370/329 |
| 2010/0150206 A1* | 6/2010 | Futagi et al. | 375/130 |
| 2010/0159935 A1* | 6/2010 | Cai et al. | 455/450 |
| 2010/0173641 A1* | 7/2010 | Kim et al. | 455/450 |
| 2010/0183047 A1* | 7/2010 | Nakao et al. | 375/130 |
| 2010/0195607 A1* | 8/2010 | Lee et al. | 370/329 |
| 2010/0290439 A1 | 11/2010 | Dai et al. | |
| 2010/0329159 A1* | 12/2010 | Xia et al. | 370/280 |
| 2011/0032926 A1 | 2/2011 | Xia et al. | |
| 2011/0189976 A1 | 8/2011 | Wu et al. | |
| 2011/0211546 A1* | 9/2011 | Hooli et al. | 370/329 |
| 2011/0292900 A1* | 12/2011 | Ahn et al. | 370/329 |
| 2012/0069793 A1* | 3/2012 | Chung et al. | 370/315 |
| 2012/0113831 A1* | 5/2012 | Pelletier et al. | 370/252 |
| 2013/0064116 A1* | 3/2013 | Speight et al. | 370/252 |
| 2013/0315165 A1* | 11/2013 | Suzuki et al. | 370/329 |

FOREIGN PATENT DOCUMENTS

| | | |
|---|---|---|
| CN | 101222291 A | 7/2008 |
| CN | 101227231 A | 7/2008 |
| CN | 101286780 A | 10/2008 |
| CN | 101296513 A | 10/2008 |
| CN | 101335550 A | 12/2008 |
| WO | WO 2009/045734 A2 | 4/2009 |

OTHER PUBLICATIONS

ZTE, "PUCCH resource region for LTE•A," 3GPP, R1•090513, Slovenia, Jan. 12-16, 2009.
ZTE, "Control Channel Structure and Mapping Pattern of Backhaul Link," 3GPP, R1-091424, Korea, Mar. 23-27, 2009.
Huawei et al., "Un PUCCH Design," 3GPP RI-I05256, China, Oct. 11-15, 2010.
ZTE, "Un PUCCH Resource Allocation and Multiplexing," 3GPP, R1-104564, Spain, Aug. 23-27, 2010.
Extended European Search Report dated (mailed) Dec. 27, 2011, issued in related Application No. 09843849.2-2412, PCT/CN2009071492, Hauwei Technologies Co., Ltd.
3rd Generation Partnership Project; Technical Specification Group Radio Access Network; Evolved Universal Terrestrial Radio Access (E-UTRA); Physical Channels and Modulation, 3GPP TS 36.211 V8.6.0 (Mar. 2009).
Written Opinion of the International Searching Authority (translation) dated (mailed) Feb. 4, 2010, issued in related Application No. PCT/CN2009/071492, filed Apr. 27, 2009, Huawei Technologies Co., Ltd.
International Search Report for International Application No. PCT/CN2009/071492, mailed Feb. 4, 2010 Huawei Technologies Co., Ltd.
First Chinese Office Action received in Chinese Application No. 200980158176.7, mailed Jul. 27, 2012, 10 pages.
"Discussion paper on the control channel and data channel optimization for relay link," 3GPP TSG-RAN Working Group 1 Meeting #56bis, R1-091384, Seoul, Korea, Mar. 23-27, 2009, 9 pages.

* cited by examiner

|  | Pilot Time Domain Orthogonal Code | | | Data Time Domain Orthogonal Code | | |
|---|---|---|---|---|---|---|
| Frequency Domain Cyclic Shift Code | Time domain orthogonal code 0 | Time domain orthogonal code 1 | Time domain orthogonal code 2 | Time domain orthogonal code 0 | Time domain orthogonal code 1 | Time domain orthogonal code 2 |
| PUCCH format 1/1a/1b on the first RB resource | | | | | | |
| 0 | K=0 |  | K=12 | K=0 |  | K=12 |
| 1 |  | K=6 |  |  | K=5 |  |
| 2 | K=1 |  | K=13 | K=1 |  | K=13 |
| 3 |  | K=7 |  |  | K=6 |  |
| 4 | K=2 |  | K=14 | K=2 |  | K=14 |
| 5 |  | K=8 |  |  | K=7 |  |
| 6 | K=3 |  | K=15 | K=3 |  | K=15 |
| 7 |  | K=9 |  |  | K=9 |  |
| 8 | K=4 |  | K=16 | K=4 |  | K=16 |
| 9 |  | K=10 |  |  | K=10 |  |
| 10 | K=5 |  | K=18 | K=5 |  | K=18 |
| 11 |  | K=11 |  |  | K=11 |  |
| PUCCH format 2/1a/1b on the second RB resource | | | | | | |
| 0 | K=19 |  | K=12 | K=19 |  | K=12 |
| 1 |  | K=25 |  |  | K=25 |  |
| 2 | K=20 |  | K=31 | K=20 |  | K=31 |
| 3 |  | K=26 |  |  | K=26 |  |
| 4 | K=21 |  | K=32 | K=21 |  | K=32 |
| 5 |  | K=27 |  |  | K=27 |  |
| 6 | K=22 |  | K=33 | K=22 |  | K=33 |
| 7 |  | K=28 |  |  | K=28 |  |
| 8 | K=23 |  | K=34 | K=23 |  | K=34 |
| 9 |  | K=29 |  |  | K=29 |  |
| 10 | K=24 |  | K=35 | K=24 |  | K=35 |
| 11 |  | K=30 |  |  | K=30 |  |
| ... | | | | | | |
| PUCCH format 2/1a/1b on the n$^{th}$ RB resource | | | | | | |
| ... | ... | ... | ... | ... | ... | ... |

METHOD, BASE STATION, AND RELAY DEVICE FOR RECEIVING PHYSICAL UPLINK CONTROL INFORMATION

CROSS-REFERENCE TO RELATED APPLICATIONS

This application is a continuation of International Application No. PCT/CN2009/071492, filed on Apr. 27, 2009, which is hereby incorporated by reference in its entirety.

FIELD OF THE INVENTION

The present invention relates to the field of wireless communication technologies, and in particular to a method, base station, and relay device for receiving physical uplink control information.

BACKGROUND OF THE INVENTION

In the 3GPP (3rd Generation Partnership Project, 3rd Generation Partnership Project) LTE (long-term evolution, long-term evolution) R8 (Release 8, Release 8), or in the follow-up evolved standard, to maintain orthogonality between subcarriers of a 3GPP LTE terminal, headers and tails of all uplink sub-frames on a relay need to vacate an OFDM (orthogonal frequency division multiplexing, orthogonal frequency division multiplexing) symbol to provide a switchover time for the Relay to switch between the receiving state and the transmission state. The switchover time is generally called a GAP (GAP). The physical uplink control channel (PUCCH) is to bear a scheduling application instruction, ACK/NACK (acknowledgement/negative-acknowledgement, acknowledgement/negative-acknowledgement), and CQI (channel quality indicator, channel quality indicator). The format of the information sent by the PUCCH includes formats such as format 1/1a/1b (a first format in this specification), and format 2/2a/2b (a second format in this specification).

SUMMARY OF THE INVENTION

In order to effectively ensure orthogonality between the PUCCH information of a Relay and that of a 3GPP LTE terminal where the PUCCH information of the relay is in a first format, an embodiment of the present invention provides a method for receiving physical uplink control information, where the method includes:

selecting a PUCCH resource of a relay, where the PUCCH resource of the relay can be multiplexed with a first resource, where the first resource includes the PUCCH resource occupied by the 3GPP LTE terminal for transmitting the physical uplink control information in the first format;

determining a channel index corresponding to the PUCCH resource of the relay;

transmitting notification information to the relay, where the notification information includes the channel index; and receiving the physical uplink control information transmitted, according to the channel index, by the relay.

An embodiment of the present invention further provides a base station, where the base station includes:

a selecting module, configured to select a PUCCH resource of a relay, where the PUCCH resource of the relay can be multiplexed with a first resource, where the first resource includes the PUCCH resource occupied by a 3GPP LTE terminal for transmitting the physical uplink control information in a first format;

a determining module, configured to determine a channel index corresponding to the PUCCH resource of the relay;

a transmitting module, configured to transmit notification information to the relay, where the notification information includes the channel index; and a receiving module, configured to receive the physical uplink control information, where the physical uplink control information is transmitted by the relay according to the channel index.

An embodiment of the present invention further provides a relay device, where the device includes:

a receiving module, configured to receive notification information transmitted by a base station, where the notification information includes a channel index, where the channel index is the channel index corresponding to a PUCCH resource of the relay, where the PUCCH resource can be multiplexed with a first resource, and the first resource includes the PUCCH resource occupied by a 3GPP LTE terminal for transmitting the physical uplink control information in a first format; and a transmitting module, configured to transmit the physical uplink control information to the base station according to the channel index.

According to this embodiment, the PUCCH resource of the relay, where the PUCCH resource can be multiplexed with the first resource, is selected, and the channel index corresponding to the PUCCH resource of the relay is determined and notified to the relay, which can ensure orthogonality between the PUCCH information of the Relay and that of the 3GPP LTE terminal where the information is in the first format, and thereby effectively reduces the interference between a PUCCH format 1/1a/1b of the Relay and that of 3GPP LTE terminal.

BRIEF DESCRIPTION OF THE DRAWINGS

FIG. 5 is a mapping table between a channel index and a resource block (RB) resource serial number, time domain orthogonal code serial number, and frequency domain cyclic shift sequence code serial number.

DETAILED DESCRIPTION OF THE EMBODIMENTS

The ACK channel structure and the CQI channel structure on the uplink PUCCH in the LTE R8 standard both relate to a time slot structure. However, the structure of an uplink data sub-frame transmitted by a Relay node is special and different from that of a standard conventional uplink sub-frame of the 3GPP LTE R8 A possibility that one sub-frame needs one or two gaps exists. If one OFDM symbol is left vacant to achieve a Gap, the number of OFDM symbols in the structure of the uplink data sub-frame transmitted by the Relay node is inconsistent with the usual number of OFDM symbols in the LTE system. Therefore, the number of data symbols in PUCCH information in the first format transmitted by the Relay is different from that of symbols in PUCCH information in the first format of the 3GPP LTE R8, which causes that the length of an orthogonal code in the data symbol in the PUCCH information in the first format transmitted by the relay is different from the length of an orthogonal code of the data symbol in the PUCCH information in the first format transmitted by a terminal of the 3GPP LTE R8 3. Orthogonal codes of different lengths cannot be orthogonal, which cause interference between the PUCCH information in the first format of the relay and that of the terminal of the 3GPP LTE R8.

According to the following embodiments of the present invention, the PUCCH resource of a relay, where the PUCCH resource can be multiplexed with the first resource, is selected, and the channel index corresponding to the PUCCH resource of the relay is determined and notified to the relay, which can ensure orthogonality between the PUCCH information in the first format of the relay and that of the 3GPP LTE terminal, and then effectively reduce the interference between the PUCCH format 1/1a/1b of the relay and that of the 3GPP LTE terminal.

Embodiment 1

Figure 1:
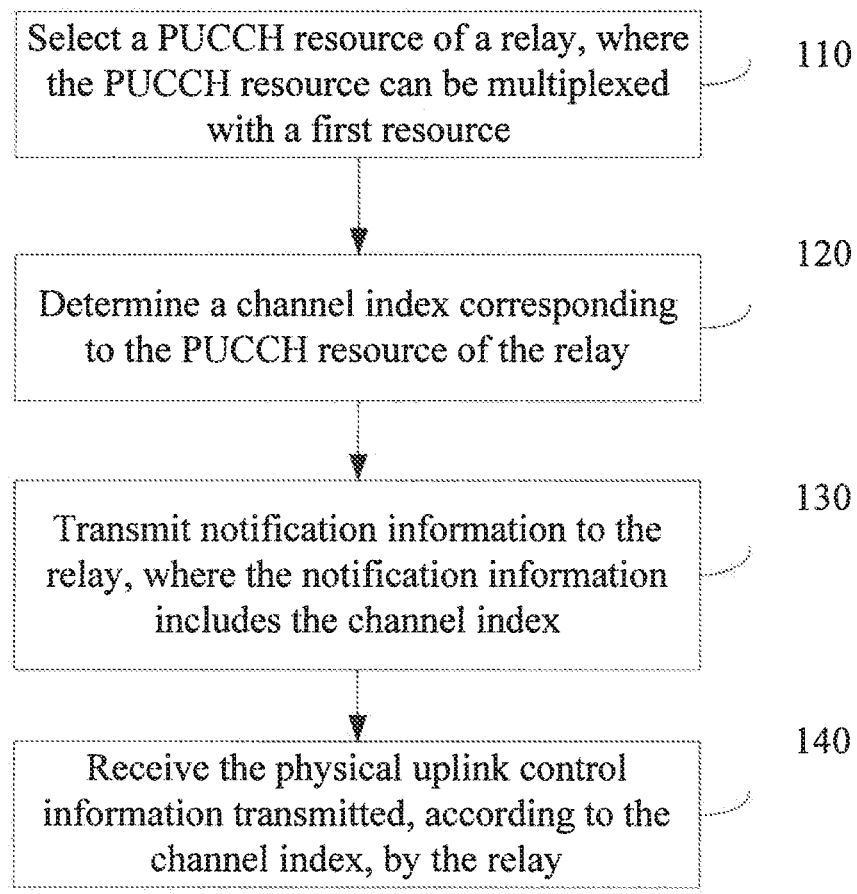
FIG. 1 is a flowchart of a method for receiving physical uplink control information according to Embodiment 1 of the present invention.

A method for receiving physical layer uplink control information is provided in an embodiment of the present invention. As shown in FIG. 1, the specific steps in this embodiment of the present invention are as follows.

110: Select a PUCCH resource of a relay, where the PUCCH resource can be multiplexed with a first resource, where the first resource includes the PUCCH resource occupied by a 3GPP LTE terminal for transmitting the physical uplink control information in a first format.

According to this embodiment, the PUCCH resource of the relay may be the PUCCH resource occupied by the relay for transmitting the physical uplink control information in the first format; and also may be the PUCCH resource occupied by the relay for transmitting physical uplink control information in the first format and physical uplink control information in the second format.

120: Determine a channel index corresponding to the PUCCH resource of the relay.

After a base station selects the PUCCH resource of a relay, where the PUCCH resource can be multiplexed with the first resource, a channel index is determined according to the PUCCH resource of the relay.

130: Transmit notification information to the relay, where the notification information includes the channel index.

The base station notifies the relay of the channel index when the relay transmits the physical uplink control information.

140: Receive the physical uplink control information transmitted, according to the channel index, by the relay.

Following an inverse process of step 120, the relay determines, according to the channel index, the PUCCH resource, for example, frequency domain resource, frequency domain cyclic shift sequence code, and time domain orthogonal code, corresponding to the channel index; and on the frequency domain resource corresponding to the channel index, transmits the uplink control information using the PUCCH format 1/1a/1b, that is, the first format, of the frequency domain cyclic shift code and time domain orthogonal code that are corresponding to the channel index.

According to this embodiment, the PUCCH resource of the relay is selected, where the PUCCH resource can be multiplexed with the first resource, and the channel index corresponding to the PUCCH resource of the relay is determined and notified to the relay, which can effectively ensure orthogonality between the first format PUCCH information of the relay and that of the 3GPP LTE terminal and then effectively reduces the interference between the PUCCH format 1/1a/1b of the relay and that of the 3GPP LTE terminal.

Embodiment 2

Figure 2:
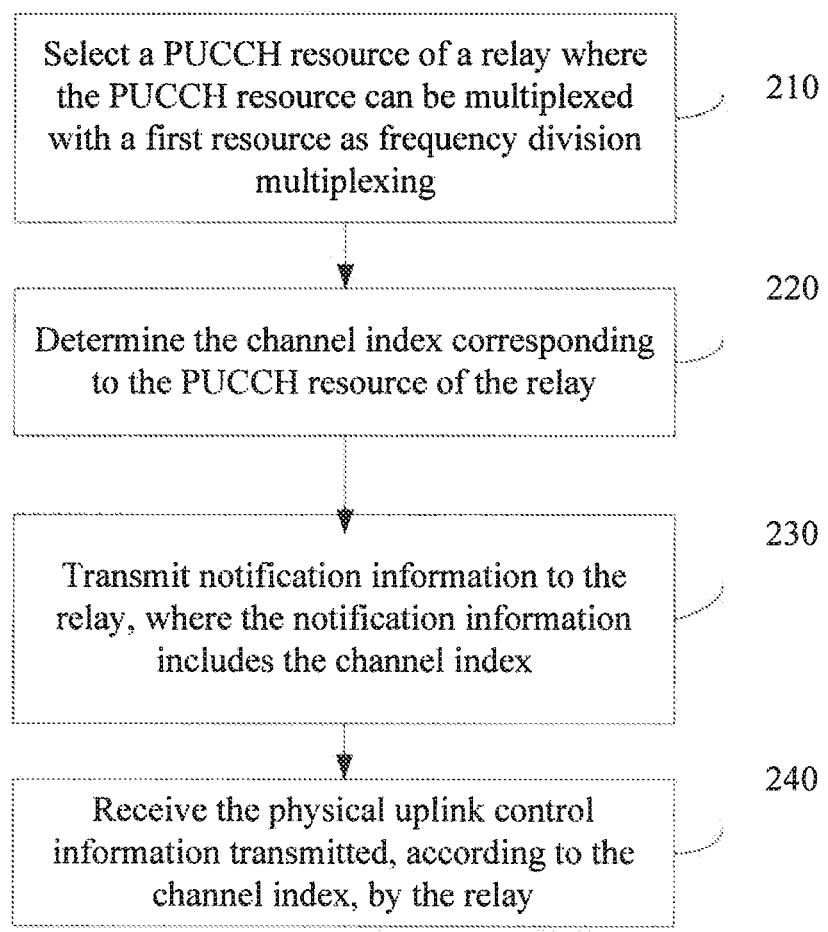
FIG. 2 is a flowchart of a method for receiving physical uplink control information according to Embodiment 2 of the present invention.

A method for receiving physical uplink control information is provided in an embodiment based on Embodiment 1. As shown in FIG. 2, the specific steps in the embodiment of the present invention are as follows:

210: Select a PUCCH resource of the relay, where the PUCCH resource can be multiplexed with a first resource through frequency division multiplexing, and the first resource includes the PUCCH resource occupied by a 3GPP LTE terminal for transmitting the physical uplink control information in the first format.

According to embodiments of the present invention, the PUCCH resource of the relay may be the PUCCH resource occupied by the relay for transmitting the physical uplink control information in the first format; and the PUCCH resource of the relay also may be the PUCCH resource occupied by the relay for transmitting physical uplink control information in the first format and physical uplink control information in the second format. According to this embodiment, the PUCCH resource of the relay may be the PUCCH resource occupied by the relay for transmitting the physical uplink control information in the first format. 3GPP LTE terminals may include a 3GPP LTE R8 terminal and a 3GPP LTE R9 terminal.

Considering the channel structure of the PUCCH of the Relay during transmission of information in the first format is different from that of the PUCCH of the 3GPP LTE terminal during transmission of information in the first format, in this embodiment, the PUCCH resource that can be multiplexed with the first resource may be selected to maintain orthogonality between the PUCCH on which the Relay transmits the information in the first format and the PUCCH on which the 3GPP LTE terminal transmits the information in the first format. The PUCCH resource of the relay, where the PUCCH resource can be multiplexed with the first resource through frequency division multiplexing, may be PUCCH resource that is reserved for the Relay in the PUCCH frequency domain resource of the 3GPP LTE terminal and is the frequency domain resource occupied by the physical uplink control information in the first format of the Relay.

Specifically, in step 210, the PUCCH resource of the relay, where the PUCCH resource can be multiplexed with the first resource through frequency division multiplexing may be of the following four types:

(1) Frequency domain resource being located at both ends of the frequency domain resource occupied by the 3GPP LTE terminal for transmitting the physical uplink control information, and being occupied by the relay for transmitting the physical uplink control information in the first format.

Figure 3:
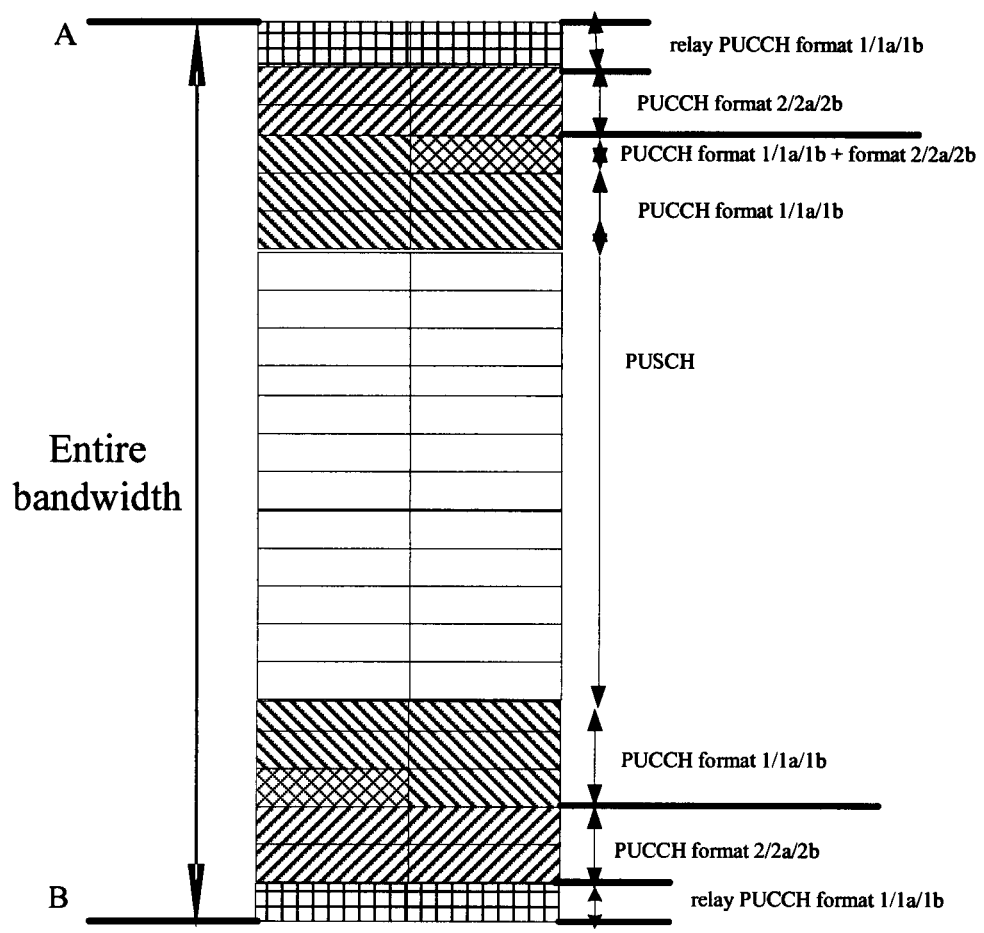
FIG. 3 is a schematic diagram of frequency domain of Relay and LET users according to Embodiment 2 of the present invention.

Referring to FIG. 3, the uplink system bandwidth is used between line A and line B in FIG. 3. The frequency domain resource occupied by the PUSCH (physical uplink shared channel, physical uplink shared channel) is located at the middle part of the entire uplink system bandwidth, and the frequency domain resource occupied by the PUCCH of the 3GPP LTE terminal is located at the both ends of the entire uplink system bandwidth. However, the PUCCH format 1/1a/1b of the Relay is beyond the frequency domain resource occupied by the PUCCH format 1/1a/1b and the PUCCH format 2/2a/2b of the LTE R8 terminal, and close to the edge of the available frequency band. This can ensure the PUCCH resource of the relay can form frequency division multiplexing with the first resource.

(2) Frequency domain resource being located between the frequency domain resource occupied by the 3GPP LTE terminal for transmitting the physical uplink control information in the first format and the frequency domain resource occupied by the 3GPP LTE terminal for transmitting the physical uplink control information in the second format, and being occupied by the relay for transmitting the physical uplink control information in the first format.

Figure 4:
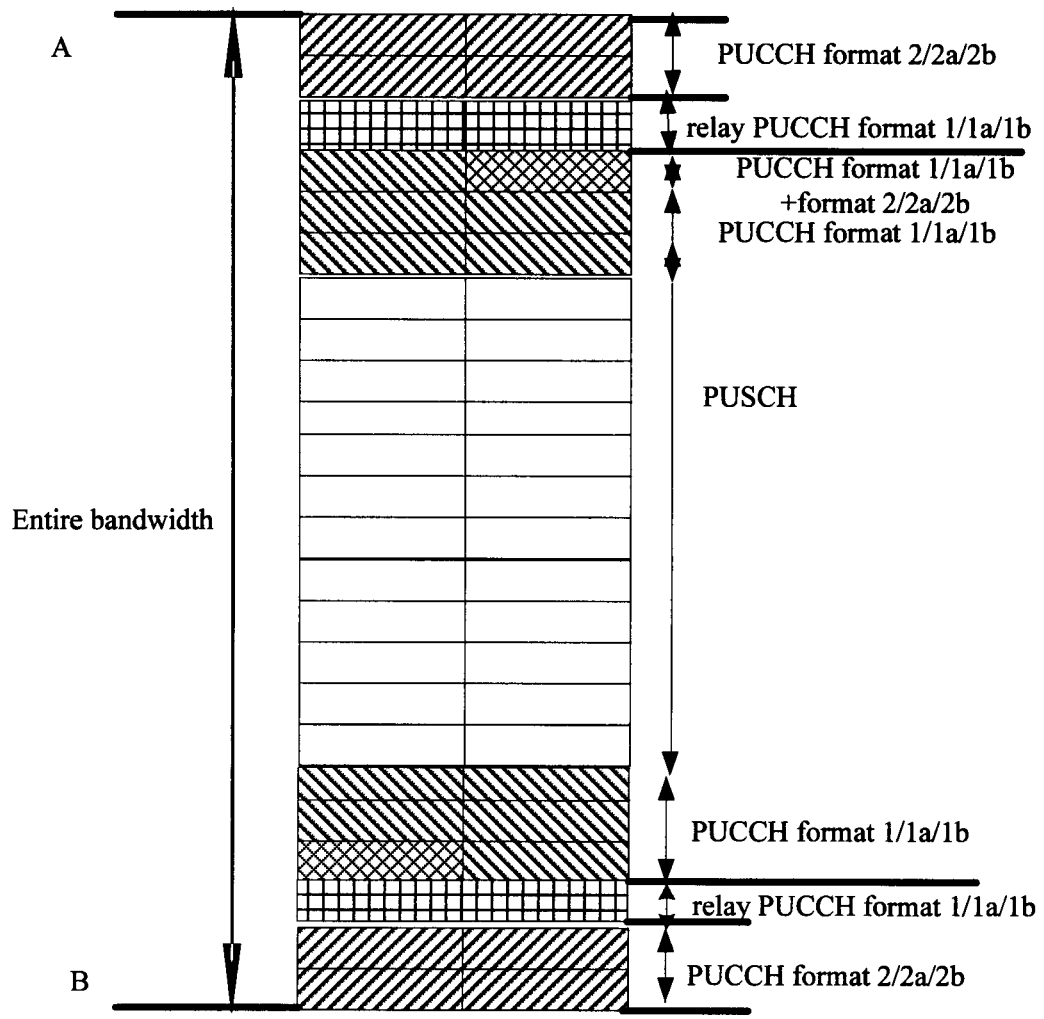
FIG. 4 is another schematic diagram of frequency domains of Relay and LET users according to Embodiment 2 of the present invention.

As shown in FIG. 4, the frequency domain resource occupied by the PUSCH is located at the middle part of the entire system bandwidth, and the frequency domain resource occupied by the PUCCH of the 3GPP LTE terminal is located at the both ends of the entire uplink system bandwidth However, the PUCCH format 1/1a/1b of the relay is located between the frequency domain resource occupied by the PUCCH format 1/1a/1b of the 3GPP LTE terminal and the frequency domain resource occupied by the PUCCH format 2/2a/2b, and close to the edge of the available frequency band. This can ensure the frequency division multiplexing between the PUCCH resource of the relay and the first resource.

(3) Frequency domain resource being located between the frequency domain resource occupied by the 3GPP LTE terminal for transmitting the physical uplink control information that is in the first format and corresponding to semi persistent scheduling data, and the frequency domain resource occupied by the 3GPP LTE terminal for transmitting the physical uplink control information that is in the first format and corresponding to the dynamic scheduling data, and being occupied by the relay for transmitting the physical uplink control information in the first format.

There are two types of ACK/NACK transmitted in the PUCCH format 1a/1b. One is an SPS (semi persistent scheduling, semi persistent scheduling) ACK/NACK, and the corresponding PUCCH format 1a/1b channel index is notified by the base station. The other is a dynamic scheduling ACK/NACK, and the PUCCH format 1a/1b channel index used by the dynamic scheduling ACK/NACK is mapped in hidden mode by a control channel element (CCE) with the smallest ID occupied by the physical downlink control channel (PDCCH) for downlink resource allocation corresponding to the dynamic scheduling. For orthogonality between the PUCCH on which the Relay transmits the physical uplink control information in the first format and the PUCCH on which the 3GPP LTE terminal transmits the physical uplink control information in the first format, the frequency domain resource occupied by the Relay for transmitting the information in the first format may be located between the frequency resource occupied by the 3GPP LTE terminal for transmitting the information that is in the first format and corresponding to semi persistent scheduling data and the frequency domain resource occupied by the information in the first format corresponding to dynamic scheduling data. In this way, the frequency division multiplexing of the PUCCH resource of the relay and the first resource is ensured.

(4) Frequency domain resource being located between the frequency domain resource occupied by the 3GPP LTE terminal for transmitting the physical uplink control information that is in the first format and corresponding to scheduling application instruction and the frequency domain resource occupied by the 3GPP LTE terminal for transmitting the physical uplink control information that is in the first format and corresponding to the semi persistent scheduling data, and being occupied by the relay for transmitting the physical uplink control information in the first format.

A person skilled in the art would select other PUCCH resource of the relay, where the PUCCH resource can form frequency division multiplexing with the first resource, besides the preceding four types of resources. No matter which type of resource is selected, the PUCCH format 1/1a/1b of the relay can be multiplexed with the PUCCH format 1/1a/1b of an LTE-A (Long-Term Evolution advanced, Long-Term Evolution advanced) terminal and/or PUCCH format 2/2a/2b of the LTE-A terminal, and/or the PUCCH format 2/2a/2b of the relay into the same resource block (RB).

220: Determining a channel index corresponding to the PUCCH resource of relay;

After a base station selects the PUCCH resource of the relay where the PUCCH resource can be multiplexed with a first resource, a channel index is determined according to the PUCCH resource of the relay.

For example, if the PUCCH resource (the first resource) occupied by the 3GPP LTE terminal for transmitting the physical uplink control information in the first format is the first RB, the relay uses other RBs except the first RB as the PUCCH resource to transmit the physical uplink control information to ensure that the PUCCH resource of the relay can be multiplexed with the first resource. In this embodiment, the PUCCH resource selected for the relay is the second RB. Subsequently, the frequency domain cyclic shift sequence code serial number and time domain orthogonal code serial number of the Relay need to be determined. According to Embodiment 2, a frequency domain cyclic shift code serial number and a time domain orthogonal code serial number may be randomly selected from all frequency domain cyclic shift sequence code serial numbers and time domain orthogonal code serial numbers corresponding to the second RB.

Assume that both the selected frequency domain cyclic shift code serial number and the time domain orthogonal code serial number are 2. In this embodiment, the frequency domain cyclic shift code of which the serial number is 2 is $\{e^{j\pi/4}, e^{j\pi/4}, e^{-j3\pi/4}, e^{-j3\pi/4}, e^{-j3\pi/4}, e^{-j\pi/4}, e^{-j3\pi/4}, e^{-j3\pi/4}, e^{j\pi/4}, e^{-j3\pi/4}, e^{j\pi/4}, e^{-j\pi/4}\}$, and the time domain orthogonal code of which the serial number is 2 is $\{1\ e^{j4\pi/3}\ e^{j2\pi/3}\}$. Subsequently, the channel index corresponding to the PUCCH resource of the relay needs to be determined according to the table shown in FIG. 5. FIG. 5 is a mapping table between the channel index, and a RB resource serial number, time domain orthogonal code serial number and frequency cyclic shift sequence code serial number. The left column in FIG. 5 lists the frequency domain cyclic shift sequence code serial number, the first row and second row list the time domain orthogonal codes (including pilot time domain orthogonal code and data time domain orthogonal code) and their serial numbers, and K indicates the channel index. According to FIG. 5, after the frequency domain cyclic shift sequence code serial number and time domain orthogonal code serial number that are corresponding to the RB are determined, a channel index can be uniquely determined. When the frequency domain shift code serial number is 2 and the time domain orthogonal code serial number is 2, it can be known from FIG. 5 that the channel index is 31, referring to cells with slashes in FIG. 5. That is, the channel index corresponding to the PUCCH resource occupied by the relay for transmitting the physical uplink control information in the first format is 31.

230: Transmit notification information to the relay, the notification information including the channel index.

240: Receive the physical uplink control information transmitted, according to the channel index, by the relay.

Following an inverse process of step 220, the relay determines, according to the channel index, the frequency domain resource, frequency domain cyclic shift sequence code, and time domain orthogonal code, and then on the frequency domain resource corresponding to the channel index, transmits the uplink control information using the PUCCH format 1/1a/1b of the corresponding frequency domain cyclic shift sequence code and time domain orthogonal code.

According to this embodiment, the PUCCH resource of the relay, where the PUCCH resource can be multiplexed with the first resource through frequency division multiplexing, is selected, and the channel index corresponding to the PUCCH resource of the relay is determined and notified to the relay, which can ensure orthogonality between the PUCCH information in the first format of the relay and that of the 3GPP LTE terminal and then effectively reduce the interference between the PUCCH format 1/1a/1b of the relay and that of the 3GPP LTE terminal.

Embodiment 3

Figure 6:
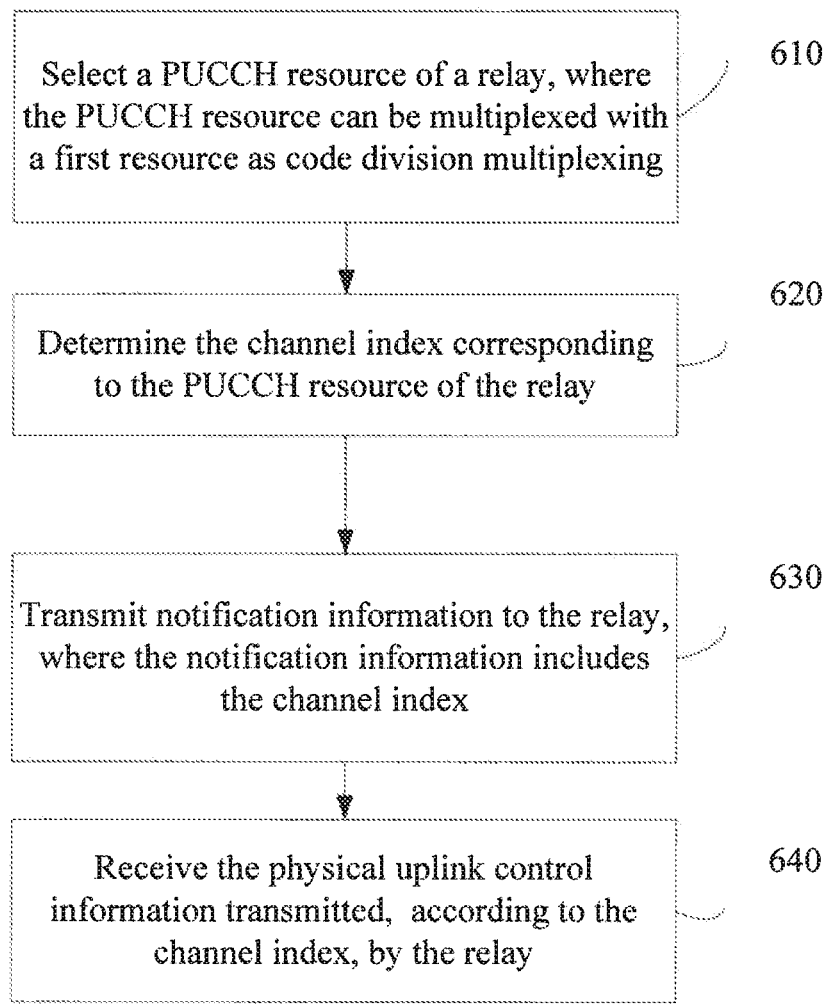
FIG. 6 is a flowchart of a method for receiving physical uplink control information according to Embodiment 3 of the present invention.

A method for receiving physical uplink control information is provided in this embodiment based on Embodiment 1. As shown in FIG. 6, the specific steps according to the embodiment of the present invention are as follows:

610: Select a PUCCH resource of a relay, where the PUCCH resource can be multiplexed with a first resource through frequency division multiplexing, and the first resource includes the PUCCH resource occupied by a 3GPP LTE terminal for transmitting the physical uplink control information in a first format.

According to the embodiment of the present invention, the preceding PUCCH resource of the relay may be the PUCCH resource occupied by the relay for transmitting the physical uplink control information in the first format; and the preceding PUCCH resource of the relay also may be the PUCCH resource occupied by the relay for transmitting the physical uplink control information in the first format and the physical uplink control information in the second format. According to this embodiment, the preceding PUCCH resource of the relay may be the PUCCH resource occupied by the relay for transmitting the physical uplink control information in the first format.

Considering the channel structure of the PUCCH of the relay when the PUCCH of the relay transmits physical uplink control information using the first format is different from that of the PUCCH of 3GPP LTE terminal when the PUCCH of 3GPP LTE terminal transmits physical uplink control information using the first format, in this embodiment, the PUCCH resource of the relay, where the PUCCH resource can be multiplexed with the first resource, may be selected to maintain channel orthogonality between the PUCCH on which the relay transmits the physical uplink control information in the first format and the PUCCH on which the 3GPP LTE transmits the physical uplink control information in the first format.

PUCCH format 1/1a/1b in the 3GPP LTE standard uses two-dimensional expansion to implement the orthogonality between PUCCH format 1/1a/1b channels. For PUCCH format 1/1a/1b channels using the same orthogonal cyclic code in frequency axis expansion, orthogonality is implemented by using the orthogonal codes having the same length in time axis expansion. For PUCCH format 1/1a/1b channels using different orthogonal cyclic codes in frequency axis expansion, orthogonality is implemented by using different orthogonal cyclic serial codes regardless of whether the orthogonal codes used in time axis expansion are consistent or not. It is impossible for the PUCCH format 1/1a/1b channel of the relay to use the orthogonal code having the same length as that of the orthogonal code in the 3GPP LTE standard to perform expansion on the time axis, because the number of orthogonal frequency division multiplexing (OFDM) data symbols of the relay in a timeslot is generally different from the number of symbols of the 3GPP LTE terminal in a time slot. Therefore, in this embodiment, orthogonality between the PUCCH format 1/1a/1b channel of the relay and the PUCCH format 1/1a/1b channel of a common 3GPP LTE terminal cannot be maintained by using the time domain orthogonal code on the time axis.

According to this embodiment, to ensure orthogonality between the PUCCH format 1/1a/1b channel of the relay and the PUCCH format 1/1a/1b channel of a common 3GPP LTE terminal on the same frequency resource block, the PUCCH resource occupied by the relay for transmitting the physical uplink control information in the first format (format 1/1a/1b) needs to be multiplexed through code division multiplexing with the PUCCH resource (first resource) occupied by the 3GPP LTE terminal for transmitting the physical uplink control information in the first format. That is, some frequency domain cyclic shift sequence code resource is reserved for the PUCCH format 1/1a/1b channel of the Relay, so that the Relay and 3GPP LTE terminal use different frequency domain cyclic shift sequence codes.

These reserved frequency domain cyclic shift code resource may be used on the PUCCH format 1/1a/1b channel. The orthogonality between the PUCCH format 1/1a/1b channel of the relay and the PUCCH format 1/1a/1b channel of a common 3GPP LTE terminal on the same frequency resource block can be implemented by using the orthogonality between these codes.

The PUCCH resource of the relay, where the PUCCH resource can be multiplexed with the first resource through code division multiplexing, may be the frequency domain resource that uses a frequency domain cyclic shift sequence code resource different from that used by the 3GPP LTE terminal, and is occupied by the Relay for transmitting the physical uplink control information in the first format.

Step 620: Determine the channel index corresponding to the PUCCH resource of the relay;

After a base station selects the PUCCH resource of the relay, where the PUCCH resource can be multiplexed with the first resource, a channel index is determined according to the PUCCH resource of the relay.

For example, assume that the PUCCH resource (the first resource) occupied by the 3GPP LTE terminal for transmitting the physical uplink control information in the first format and the PUCCH resource of the Relay are multiplexed in the same physical RB, and that the physical RB is the first RB. If the frequency domain cyclic shift sequence code serial number corresponding to the PUCCH resource (the first resource) occupied by the 3GPP LTE terminal for transmitting the physical uplink control information in the first format is 1, to ensure that the PUCCH resource of the Relay can be multiplexed with the first resource through code division multiplexing, frequency domain cyclic shift code serial number corresponding to the PUCCH resource occupied by the Relay for transmitting the physical uplink control information in the first format is any serial number except 1. Assume that the frequency domain cyclic shift sequence code serial number corresponding to the PUCCH resource occupied by the Relay for transmitting the physical uplink control information in the first format is 2, according to FIG. 5, K=1 may be selected (if the value 1 of K is not allocated to another relay). If the value 13 of K is not allocated to another relay, K=13 may also be selected.

Further, if the PUCCH format 1/1a/1b channel index k=0 (the corresponding frequency domain orthogonal cyclic shift sequence code is 0 and the time domain orthogonal code is 0) is allocated to the Relay, the PUCCH format 1/1a/1b channel index K=12 (the corresponding frequency domain orthogonal cyclic shift sequence code is 0 and the time domain orthogonal code is 12) cannot be allocated to the 3GPP LTE terminal. That is, the frequency domain orthogonal cyclic shift sequence code of the 3GPP LTE terminal and that of the relay on the same RB must be different. In other words, on the same RB, the 3GPP LTE terminal and the Relay achieves orthogonality using different frequency orthogonal cyclic shift codes. Two Relays may share the same frequency domain orthogonal cyclic shift sequence code as long as the time domain orthogonal codes are different.

If the PUCCH format 1/1a/1b channel index k=0 (the corresponding frequency domain orthogonal cyclic shift sequence code is 0 and the time domain orthogonal code is 0) is allocated to the Relay, and the PUCCH format 1/1a/1b channel index K=12 of is also allocated to the Relay, the Relay may use a SCTD (space code transmit diversity, space code transmit diversity): the Relay transmits the time domain orthogonal code corresponding to K=0 on one antenna and transmits the domain orthogonal code corresponding to K=12 on another antenna. That is, the same Relay occupies two PUCCH format 1/1a/1b channel indexes (for example, K=0 and K=12) corresponding to one frequency domain orthogonal cyclic shift sequence code. That is, a Relay is differentiated from other terminals (including a 3GPP LTE terminal, an LTE-A terminals, and Relay) through the frequency domain cyclic shift sequence code rather than through the time domain orthogonal code. In this way, orthogonality between the PUCCH format 1/1a of the Relay and the PUCCH format 1/1a of the 3GPP LTE terminal is ensured and then the interference between the PUCCH format 1/1a/1b channels of the relay and LTE R8 terminal is effectively reduced.

630: Transmit notification information to the relay, where the notification information includes the channel index.

640: Receive the physical uplink control information transmitted, according to the channel index, by the relay.

Following an inverse process of step 620, the relay determines the frequency domain resource, frequency domain cyclic shift code, and time domain orthogonal code according to the channel index, and then on the frequency domain resource corresponding to the channel index, transmits the uplink control information using the PUCCH format 1/1a/1b of the corresponding frequency domain cyclic shift code and time domain orthogonal code.

According to the embodiment of the present invention, the PUCCH resource of the relay, where the PUCCH resource can be multiplexed with the first resource, is selected, and the channel index corresponding to the PUCCH resource of the relay is determined and notified to the relay, which can effectively ensure orthogonality between the information forwarded by the relay and transmitted by the 3GPP LTE terminal on the PUCCH in the first format and then effectively reduces the interference between the PUCCH format 1/1a/1b of the relay and that of the 3GPP LTE terminal.

Embodiment 4

Figure 7:
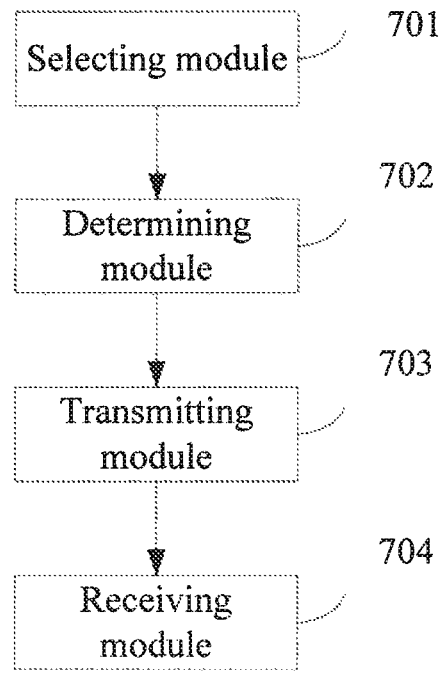
FIG. 7 is a structure diagram of a base station according to Embodiment 4 of the present invention.

One embodiment of the present invention provides a base station, as shown in FIG. 7, the base station includes:

a selecting module 701, configured to select a PUCCH resource of a relay, where the PUCCH resource can be multiplexed with a first resource, where the first resource includes the PUCCH resource occupied by a 3GPP LTE terminal for transmitting the physical uplink control information in a first format;

a determining module 702, configured to determine a channel index corresponding to the PUCCH resource of the relay;

a transmitting module 703, configured to transmit notification information to the relay, and the notification information includes the channel index; and a receiving module 704, configured to receive the physical uplink control information, and the physical uplink control information is transmitted by the relay according to the channel index.

Further, the selecting module 701 is specifically configured to select a channel index corresponding to the PUCCH resource of a relay, where the PUCCH resource can be multiplexed with the first resource through frequency division multiplexing.

the PUCCH resource of the relay where the PUCCH resource can be multiplexed with the first resource through frequency division multiplexing may be of the following four types:

(1) Frequency domain resource located at the both ends of the frequency domain resource occupied by the 3GPP LTE terminal for transmitting the physical uplink control information, and occupied by the relay for transmitting the physical uplink control information in the first format; as shown in FIG. 3;

(2) Frequency domain resource located between the frequency domain resource occupied by the 3GPP LTE terminal for transmitting the physical uplink control information in the first format and the frequency domain resource occupied by the 3GPP LTE terminal transmitting the physical uplink control information in the second format, and occupied by the relay for transmitting the physical uplink control information in the first format, as shown in FIG. 4;

(3) Frequency domain resource located between the frequency domain resource occupied by the 3GPP LTE terminal for transmitting the physical uplink control information that is in the first format and corresponding to semi persistent scheduling data and the frequency domain resource occupied by the 3GPP LTE terminal for transmitting the physical uplink control information that is in the first format and corresponding to the dynamic scheduling data, and occupied by the relay for transmitting the physical uplink control information in the first format; and (4) Frequency domain resource located between the frequency domain resource occupied by the 3GPP LTE terminal for transmitting the physical uplink control information that is in the first format and corresponding to scheduling application instruction and the frequency domain resource occupied by the 3GPP LTE terminal for transmitting the physical uplink control information that is in the first format and corresponding to the semi persistent scheduling data, and occupied by the relay for transmitting the physical uplink control information in the first format.

The preceding four types of resources are detailed in Embodiment 2, which are not detailed here. A person skilled in the art would select other PUCCH resources of the relay, where the PUCCH resources can be multiplexed with the first resource through frequency division multiplexing, besides the preceding four types of resources. No matter which type of resource is selected, the PUCCH format 1/1a/1b of the Relay can be multiplexed with the PUCCH format 1/1a/1b and/or PUCCH format 2/2a/2b of an LTE-A (Long-Term Evolution advanced, Long-Term Evolution advanced) terminal, and/or the PUCCH format 2/2a/2b of the Relay into the same RB (Resource Block, Resource Block).

Or, the selecting module 701 is specifically configured to select the PUCCH resource of the relay, where the PUCCH resource can be multiplexed with the first resource through code division multiplexing.

The PUCCH resource of the relay, where the PUCCH resource can be multiplexed with the first resource through code division multiplexing, may be the frequency domain resource that uses a frequency domain cyclic shift code resource different from that used by the 3GPP LTE terminal, and the PUCCH resource of the relay is occupied by the relay for transmitting the physical uplink control information in the first format. The details are described in Embodiment 3 and are not detailed here.

The selecting module 701 is specifically configured to select the PUCCH resource of the relay, where the PUCCH resource can be multiplexed with the first resource through frequency division multiplexing. In this case, the method for the determining module 702 to determine the channel index corresponding to the PUCCH resource of the relay can be referred to description of Embodiment 2 and is not detailed here.

When the selecting module 701 is specifically configured to select the PUCCH resource of the relay, where the PUCCH resource can be multiplexed with the first resource through code division multiplexing, the method for the determining module 702 to determine the channel index corresponding to the PUCCH resource of the relay is as described in Embodiment 3 and is not detailed here.

According to this embodiment, the PUCCH resource of the relay, where the PUCCH resource can be multiplexed with the first resource is selected, and then the channel index corresponding to the PUCCH resource of the relay is determined and notified to the relay, which can effectively ensure orthogonality between the first-format PUCCH information of the relay and that of the 3GPP LTE terminal so that the interference between the PUCCH format 1/1a/1b channels of the relay and 3GPP LTE terminal is effectively reduced.

Embodiment 5

Figure 8:
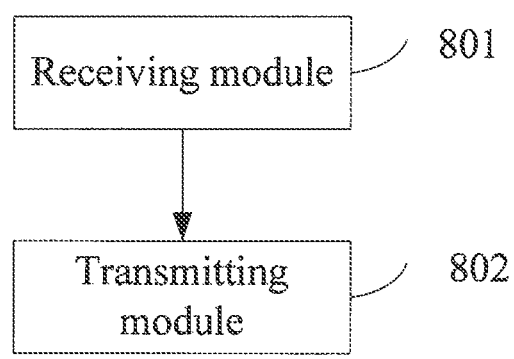
FIG. 8 is a structure diagram of a relay device according to Embodiment 5 of the present invention.

A relay device is provided in the embodiments of the present invention. As shown in FIG. 8, the relay includes:

a receiving module 801, configured to receive notification information transmitted by a base station, where the notification information includes a channel index; the channel index is: the channel index corresponding to a PUCCH resource of a relay, where the PUCCH resource can be multiplexed with a first resource, and the first resource includes the PUCCH resource occupied by a 3GPP LTE terminal for transmitting the physical uplink control information in a first format; and a transmitting module 802, configured to transmit the physical uplink control information to the base station according to the channel index.

Further, the channel index received by the receiving module 801 is the channel index corresponding to the PUCCH resource of the relay, where the PUCCH resource can be multiplexed with the first resource through frequency division multiplexing.

Specifically, the PUCCH resource of the relay, where the PUCCH resource can be multiplexed with the first resource through frequency division multiplexing may be the following four types:

(1) frequency domain resource located at the both ends of the frequency domain resource occupied by the 3GPP LTE terminal for transmitting the physical uplink control information, and occupied by the relay for transmitting the physical uplink control information in the first format, as shown in FIG. 3;

(2) frequency domain resource located between the frequency domain resource occupied by the 3GPP LTE terminal for transmitting the physical uplink control information in the first format and the frequency domain resource occupied by the 3GPP LTE terminal for transmitting the physical uplink control information in a second format, and occupied by the relay for transmitting the physical uplink control information in the first format, as shown in FIG. 4;

(3) frequency domain resource located between the frequency domain resource occupied by the 3GPP LTE terminal for transmitting the physical uplink control information that is in the first format and corresponding to semi persistent scheduling data and the frequency domain resource occupied by the 3GPP LTE terminal for transmitting the physical uplink control information that is in the first format and corresponding to the dynamic scheduling data, and occupied by the relay for transmitting the physical uplink control information in the first format; and (4) frequency domain resource located between the frequency domain resource occupied by the 3GPP LTE terminal for transmitting the physical uplink control information that is in the first format and corresponding to scheduling application instruction and the frequency domain resource occupied by the 3GPP LTE terminal for transmitting the physical uplink control information that is in the first format and corresponding to the semi persistent scheduling data, and occupied by the relay for transmitting the physical uplink control information in the first format.

The preceding four types of resources are detailed in Embodiment 2, and are not detailed here. A person skilled in the art would select other PUCCH resources of the relay, where the PUCCH resources can be multiplexed with the first resource through frequency division multiplexing, besides the preceding four types of resources. No matter which type of resource is selected, the PUCCH format 1/1a/1b of the relay can be multiplexed with the PUCCH format 1/1a/1b and/or PUCCH format 2/2a/2b of an LTE-A terminal, and/or the PUCCH format 2/2a/2b of the relay into the same RB.

After the PUCCH resource of the preceding relay is determined according to the any one of the preceding methods. The corresponding channel index is determined according to the PUCCH resources of the preceding relay. The method for determining the channel index corresponding to the PUCCH resources of the preceding relay is described as described in Embodiment 2, and is not detailed here.

Or, the channel index received by the receiving module 801 is the channel index corresponding to the PUCCH resource of the relay, where the PUCCH resources can be multiplexed with a first resource through code division multiplexing.

The PUCCH resource of the relay, where the PUCCH resource can be multiplexed with the first resource through code division multiplexing, may be the code domain resource that is occupied by the Relay for transmitting the physical uplink control information in the first format, and uses different frequency and domain circulation shift sequence code resource from that used by the 3GGP LTE terminal. Which is detailed in Embodiment 3 and is not detailed here After the PUCCH resources of the preceding relay are determined according to the preceding method. The corresponding channel index is determined according to the PUCCH resources of the preceding relay. The method for determining the channel index corresponding to the PUCCH resources of the preceding relay is described as shown in Embodiment 3, which is not detailed here.

According to the embodiment of the present invention, the relay receives, through the receiving module, the specified channel index transmitted by the base station, and transmits the physical uplink control information to the base station according to the channel index, which can effectively ensure the orthogonality between the PUCCH information in the first format of the relay and that of the 3GPP LTE terminal, and then effectively reduces the interference between the PUCCH format 1/1a/1b channels of the relay and of 3GPP LTE terminal.

Parts of the embodiments of the present invention can be implemented by software. The corresponding software program may be stored in a readable storage medium, such as: a hard disk or cache of the router, or a compact disk.

The sequence numbers of the preceding embodiments do not indicate the preference of the embodiments.

In conclusion, what is described above is merely exemplary embodiments of the present invention, and does not intend to limit the present invention. Any variation, replacement, or improvement should fall within the protection scope of the present invention.

The invention claimed is:

1. A method for receiving physical uplink control information, comprising:
    selecting, by a base station, a physical uplink control channel (PUCCH) resource of a relay, wherein the PUCCH resource of the relay is configured to be multiplexed with a first resource, wherein the first resource comprises a PUCCH resource occupied by a 3rd Generation Partnership Project long term evolution (3GPP LTE) terminal for transmitting a first physical uplink control information in a first format;
    determining, by the base station, a channel index according to information corresponding to the PUCCH resource of the relay, the information including a resource block, a frequency domain cyclic shift sequence code, and a time domain orthogonal code;
    transmitting, by the base station, notification information to the relay, wherein the notification information comprises the channel index; and
    receiving, by the base station, a second physical uplink control information, wherein the second physical uplink control information is transmitted by the relay according to the channel index.

2. The method according to claim 1, wherein the PUCCH resource is configured to be multiplexed with the first resource through frequency division multiplexing.

3. The method according to claim 1, wherein the PUCCH resource is configured to be multiplexed with the first resource through code division multiplexing.

4. The method according to claim 2, wherein a frequency domain resource occupied by the PUCCH of the 3GPP LTE terminal for transmitting the physical link uplink control information is located at both ends of an uplink system bandwidth, and the frequency domain resource occupied by the PUCCH of the relay in the first format is beyond the frequency domain resource occupied by the PUCCH of the 3GPP LTE terminal.

5. The method according to claim 2, wherein a frequency domain resource occupied by the PUCCH of the relay is disposed between the frequency domain resource occupied by the PUCCH of the 3GPP LTE terminal for transmitting the physical link uplink control information in a first format and the frequency domain resource occupied by the PUCCH of the 3GPP LTE terminal for transmitting the physical link uplink control information in a second format.

6. The method according to claim 2, wherein a frequency domain resource occupied by the PUCCH of the relay is disposed between the frequency domain resource occupied by the PUCCH of the 3GPP LTE terminal for transmitting the physical link uplink control information in a first format and corresponding to semi persistent scheduling data and the frequency domain resource occupied by the PUCCH of the 3GPP LTE terminal for transmitting the physical link uplink control information in the first format and corresponding to dynamic scheduling data.

7. The method according to claim 2, wherein a frequency domain resource occupied by the PUCCH of the relay is disposed between the frequency domain resource occupied by the PUCCH of the 3GPP LTE terminal for transmitting the physical link uplink control information in a first format and corresponding to scheduling application instruction and the frequency domain resource occupied by the PUCCH of the 3GPP LTE terminal for transmitting the physical link uplink control information in the first format and corresponding to semi persistent scheduling data.

8. The method according to claim 3, wherein the code division multiplexing comprises:
    a code domain resource that uses a frequency domain cyclic shift code resource different from a frequency domain cyclic shift code resource used by the 3GPP LTE terminal, wherein the code domain resource is occupied by the relay for transmitting the second physical uplink control information in the first format.

9. A base station, comprising:
    a selecting module, configured to select a physical uplink control channel (PUCCH) resource of a relay, wherein the PUCCH resource is configured to be multiplexed with a first resource, wherein the first resource comprises the PUCCH resource occupied by a 3rd Generation Partnership Project long term evolution (3GPP LTE) terminal for transmitting a first physical uplink control information in a first format;
    a determining module, configured to determine a channel index according to information corresponding to the PUCCH resource of the relay, the information including a resource block, a frequency domain cyclic shift sequence code, and a time domain orthogonal code;
    a transmitting module, configured to transmit notification information to the relay, wherein the notification information comprises the channel index; and
    a receiving module, configured to receive a second physical uplink control information, wherein the physical uplink control information is transmitted by the relay according to the channel index.

10. The base station according to claim 9, wherein the PUCCH resource of the relay is configured to be multiplexed with the first resource using frequency division multiplexing.

11. The base station according to claim 9, wherein the PUCCH resource of the relay is configured to be multiplexed with the first resource using code division multiplexing.

12. A relay device, comprising:
    a receiving module, configured to receive notification information transmitted by a base station, wherein the notification information comprises a channel index, wherein the channel index is indicative of information corresponding to a physical uplink control channel (PUCCH) resource of the relay, including a resource block, a frequency domain cyclic shift sequence code, and a time domain orthogonal code, wherein the PUCCH resource of the relay is configured to be multiplexed with a first resource, wherein the first resource comprises a PUCCH resource occupied by a 3rd Generation Partnership Project long term evolution (3GPP LTE) terminal for transmitting a first physical uplink control information in a first format; and a transmitting module, configured to transmit a second physical uplink control information to the base station according to the channel index.

13. The device according to claim 12, wherein the PUCCH resource of the relay is configured to be multiplexed with the first resource using frequency division multiplexing.

14. The device according to claim 12, wherein the PUCCH resource of the relay is configured to be multiplexed with the first resource using code division multiplexing.

* * * * *